United States Patent [19]
DeLong et al.

[11] Patent Number: 5,195,286
[45] Date of Patent: Mar. 23, 1993

[54] CEILING INFEED MODULE

[75] Inventors: Ronald B. DeLong, Belmont; Allen L. Palmbos, Georgetown, both of Mich.

[73] Assignee: Westinghouse Electric Corp., Pittsburgh, Pa.

[21] Appl. No.: 697,372

[22] Filed: May 9, 1991

[51] Int. Cl.$^5$ ............................................. E04F 17/08
[52] U.S. Cl. ........................................ 52/220; 52/242; 174/48
[58] Field of Search ................. 52/239, 713, 721, 221, 52/220, 484, 243.1, 242; 174/48; 403/292, 309, 313; 49/463, 464

[56] References Cited

U.S. PATENT DOCUMENTS

| | | | |
|---|---|---|---|
| 3,609,211 | 9/1971 | Van Herk | 52/221 |
| 3,856,981 | 12/1974 | Boundy | |
| 3,889,044 | 6/1975 | Flachbarth et al. | 174/48 |
| 4,278,834 | 7/1981 | Boundy | 174/48 |
| 4,284,840 | 8/1981 | Baker | 174/48 |
| 4,373,111 | 2/1983 | Myers et al. | 174/48 |
| 4,377,724 | 3/1983 | Wilson | 174/48 |
| 4,490,954 | 1/1985 | Cresti | 52/221 |
| 4,523,415 | 6/1985 | Rosen | 52/220 |
| 4,716,698 | 1/1988 | Wilson et al. | 52/239 |
| 4,812,958 | 3/1989 | Rolfe et al. | 174/48 |
| 4,902,852 | 2/1990 | Wuertz | 174/48 |

FOREIGN PATENT DOCUMENTS

| | | | |
|---|---|---|---|
| 0987612 | 4/1976 | Canada | 174/48 |
| 0035395 | 3/1979 | Japan | 174/48 |

Primary Examiner—David A. Scherbel
Assistant Examiner—Christopher Kent
Attorney, Agent, or Firm—B. R. Studebaker

[57] ABSTRACT

A ceiling infeed module for a free standing, space dividing, wall panel system which includes, in combination, a ceiling panel for inclusion in a suspended ceiling system, a hollow space dividing wall panel and a tubular member with a removable side cap interconnecting the ceiling panel and the hollow space dividing wall panel by way of a transition. The ceiling infeed module also includes a base shroud for use in concealing the lower portion of the hollow space dividing wall panel and a ceiling escutcheon for use in concealing an aperture cut into the ceiling panel. The tubular member carries electrical and communication service from the plenum area above the suspended ceiling to a free standing, space dividing wall panel system. The tubular member construction enables the electrical and communication service to be installed either before or after the ceiling infeed module is in place.

21 Claims, 3 Drawing Sheets

CEILING INFEED MODULE

BACKGROUND OF THE INVENTION

1. Field of the Invention

This invention relates to electrified, free standing, space dividing, wall panel systems and, more particularly, to a ceiling infeed module which provides electrical and communication wiring from the ceiling to the free standing, space dividing, wall panels by way of a replaceably removable tubular member which can be installed either before or after the electrical and communication wiring has been installed.

2. Description of the Related Art

Over the past several years there has been a dramatic increase in the use of the open office plan system where movable space dividing wall panels are employed to subdivide an open office area into a plurality of work stations. Electrical and communication service has been traditionally provided to these space dividing wall panels by means of a straight-line ceiling infeed or by means of a flexible hose infeed. In each of these situations, the power is supplied through a ceiling panel from a junction box mounted within the ceiling. U.S. Pat. No. 3,856,981 issued Dec. 24, 1974 for "Power Panel Arrangement" is illustrative and descriptive of a flexible hose type ceiling infeed. However, the above mentioned ceiling infeed arrangements must first be installed before the electrical and communication cables can be installed by threading or "fishing" the cables through the ceiling infeeds. This can present a problem when repair or maintenance of the cables must be performed. The ceiling infeed and the space dividing wall panel must be removed to access the cabling. This can be time consuming and disruptive to the office personnel.

Consequently, there exists a need to be able to access the electrical and communication cabling with a minimum of effort and disruption.

SUMMARY OF THE INVENTION

In accordance with the present invention, the foregoing deficiencies of prior art are obviated by providing a ceiling infeed module for use in routing electrical and communication cable from the ceiling to free standing, space dividing wall panel systems which includes in combination a ceiling panel and wall panel connected by a novel C-shaped tubular member and a transition; the tubular member and the transition are adapted so as to be installed either before or after the electrical and communication cable has been installed.

The ceiling infeed module of this invention which is used for routing electrical and communication cable to a free standing, space dividing wall panel system comprises in combination, a ceiling panel adapted to be disposed in a suspended ceiling system with the ceiling panel having an aperture therethrough. Below the ceiling panel is situated a hollow, space dividing wall panel having an open top end. A C-shaped in cross section tubular member interconnects the aperture in the ceiling panel and the open top end of the hollow wall panel and includes a releasably retained side cap which is adapted to close off the open side of the C-shaped tubular member. A transition interconnects the bottom end of the tubular member and the open top end of the wall panel and comprises a snap fit living hinge construction that can be positioned after the tubular member and the wall panel have been installed. A ceiling escutcheon surrounds the top end of the tubular member and is mounted to the ceiling panel to conceal the aperture in the ceiling panel. The hollow space dividing wall panel includes a bottom end comprising a base weldment which is enclosed by a base shroud. The base shroud is attached to the base weldment by means thereby used to enclose and conceal the base weldment.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

The invention herein described provides a ceiling infeed module for routing electrical and communication cabling from the ceiling to a free standing, space dividing wall panel system placed some distance from the ceiling by way of a replaceably removable tubular member which can be installed, either before or after the electrical and communication cabling, thereby enabling future access to the cabling with a minimum of effort and disruption.

Figure 1:
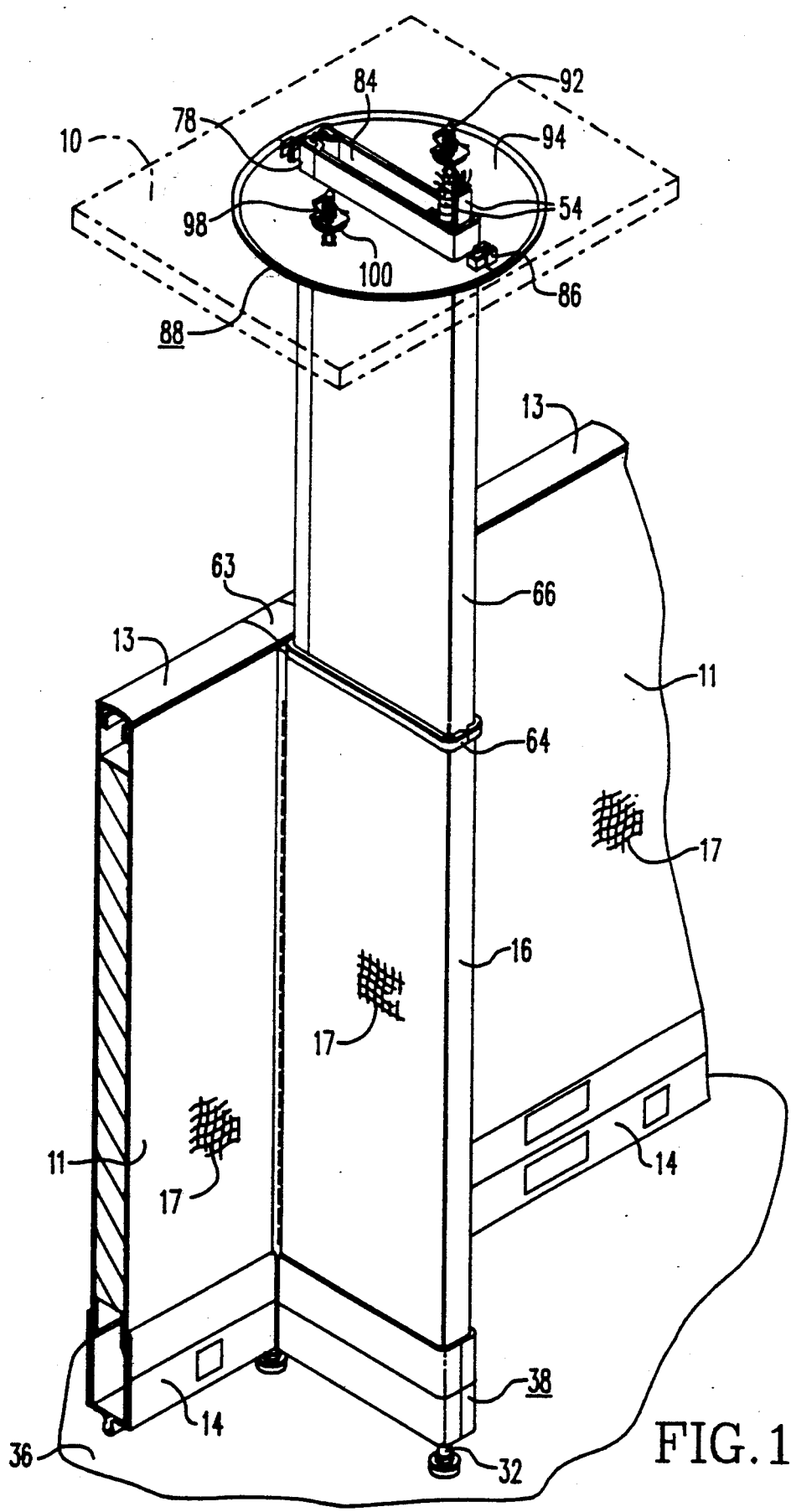
FIG. 1 is a perspective view of the ceiling infeed module of this invention including a free standing, space dividing wall panel system.
Figure 2:
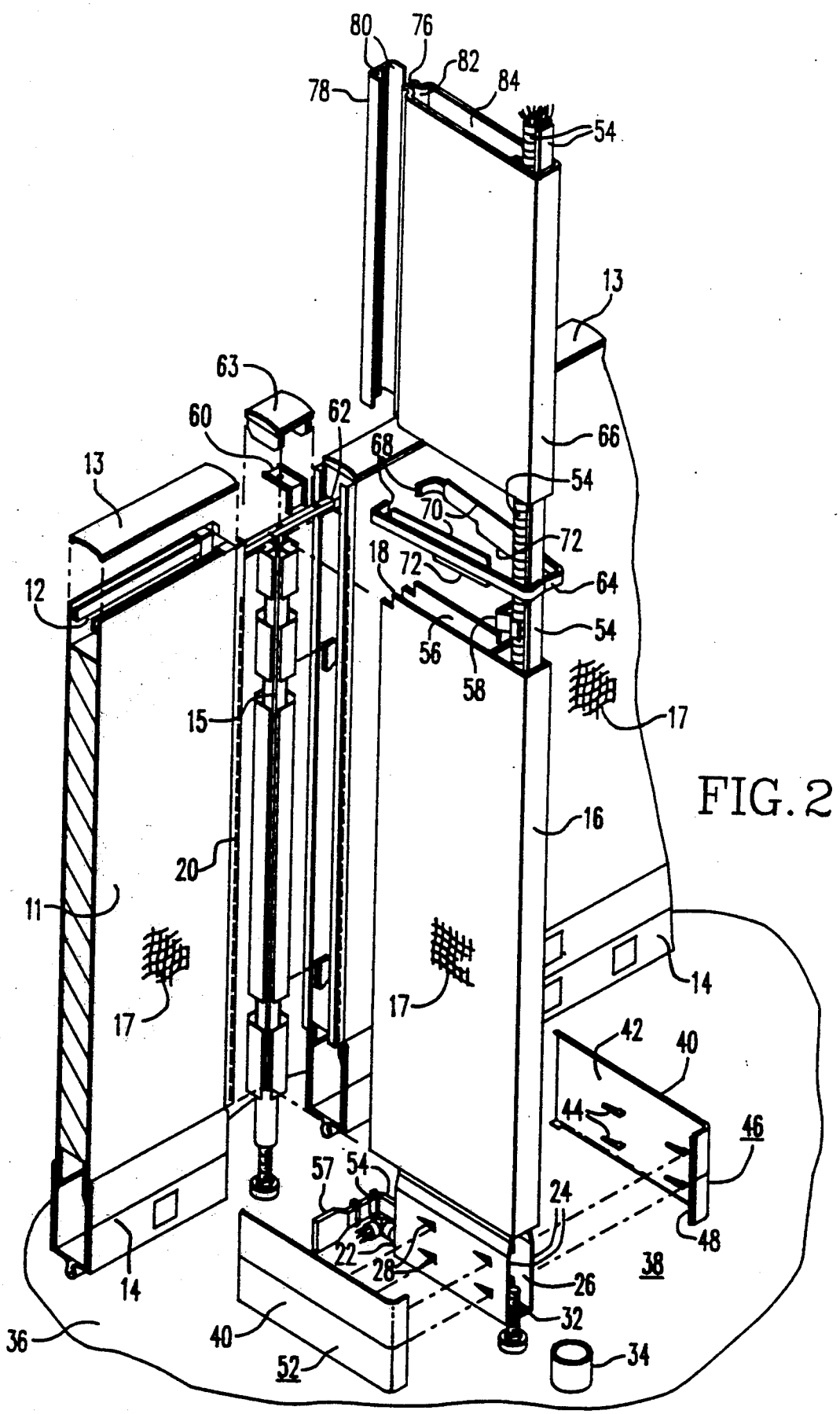
FIG. 2 is an exploded perspective view of the ceiling infeed module of FIG. 1.

Referring now in detail to the drawings wherein like reference characters represent like parts throughout the several views, there is illustrated in FIGS. 1 and 2 the ceiling infeed module of this invention connected to a space dividing wall panel system, which wall panel system is more fully detailed in the co-pending applications entitled "Office Space Dividing System," Ser. No. 07/523,772, filed May 15, 1990; "Space Dividing Partition System Having An Electrical Raceway," Ser. No. 07/523,776, filed May 15, 1990; and "Office Space Dividing System," Ser. No. 07/523,773, filed May 15, 1990, all of which are owned by the same assignee as the present application.

As illustrated in FIG. 1 there is a ceiling panel 10 adapted to be disposed in a suspended ceiling system (not shown) and a free standing, space dividing wall panel system which includes a plurality of wall panels 11 having wire troughs 12 extending along the top ends of the wall panels 11 and panel caps 13 to cover the wire troughs 12 (which are more fully described in co-pending application, Ser. No. 07/523,722), a raceway 14 (which is more fully described in co-pending application, Ser. No. 07/523,776), and a plurality of support posts 15 (which are more fully described is co-pending application, Ser. No. 07/523,773).

An elongated, hollow, aluminum space dividing wall panel 16, referred to herein as a lower body assembly, which is spaced some distance from the ceiling panel 10, may be covered with fabric 17 and includes an open side edge 18, more fully illustrated in FIG. 2, and which contains means, in this instance a slotted standard 20 on which hook connectors (not shown) may be mounted, so as to enable the lower body assembly 16 to be attached perpendicularly to the support post 15 of a free standing, space dividing wall panel system ( which is more fully described in co-pending applications, Ser. No. 07/523,722 and Ser. No. 07/523,773).

FIG. 2 also illustrates the bottom end of the lower body assembly 16, comprising a hollow, metal rectangular base weldment 22 with two parallel sides 24 and two open ends 26, the two parallel sides 24 including a plurality of triangular slots 28. The base weldment 22 also includes a metal foot 32 and leveler cup 34 which has teeth that bite into the carpet in order to secure the lower body assembly 16 to the carpeted floor 36.

A base shroud 38 completes the lower body assembly 16 by interlocking with the base weldment 22 and itself to enclose and conceal the base weldment 22. The base shroud 38 includes a plastic, two-piece removable assembly with outer surfaces 40 that aesthetically match the raceway 14 and inner surfaces 42 that include a plurality of L-shaped projections 44 used to interlock with the base weldment 22 by inserting the L-shaped projections 44 into the triangular slots 28 of the base weldment 22. One piece, 46, of the two-piece base shroud 38 includes a lip 48 which snaps together with a open slot 50 on the other piece 52 of the base shroud 38, thereby enabling the base shroud 38 to also interlock with itself and to surround and conceal the base weldment 22.

The lower body assembly 16 is hollow, as previously mentioned, in order to allow electrical and communication cabling 54 to be fed from the ceiling panel 10; the cabling 54 enters the lower body assembly 16 through the open top end 56 and continues through the lower body assembly 16, through the base weldment 22 and terminates in a jumper cable 57 which extends into the bottom electrical raceway 14 of the wall panel 11 of the free standing, space dividing wall panel system. The cabling 54 is secured inside the lower body assembly 16 by a conduit clip 58. The lower body assembly 16 is secured to the space dividing wall panel system by an L-shaped joint called an infeed spanner 60 which is screwed into the top edge of the panel-to-panel spanner 62 (which is more fully described in the co-pending application, Ser. No. 07/523,722) and covered by a post cap 63.

An interconnecting means called a transition 64 is positioned on top of the open top end 56 of the lower body assembly 16 and connects the lower body assembly 16 to a tubular member 66, herein referred to as the upper tube. The transition 64 comprises a plastic, C-shaped, snap fit, living hinge construction with two open ends, or jaws, 68 which snap together to close the transition 64 after the transition 64 has been positioned around the cabling 54. The transition 64 also includes a recessed body comprising interiorally disposed upwardly and downwardly projecting flanges, 70 and 72 respectively. The downwardly projecting flanges 72 extend into the open top end 56 of the lower body assembly 16 while the upwardly projecting flanges 70 extend into the open bottom end 74 of the upper tube 66, thereby connecting the upper tube 66 and the lower body assembly 16. The transition 64 also permits the upper tube 66 to sit in a fixed position atop the lower body assembly 16.

The upper tube 66 comprises a 3-sided, C-shaped, hollow plastic conduit open at one side edge 76 and arranged to receive the preexisting electrical and communication cabling 54 through the open side edge 76 of the upper tube 66, thereby preventing the need to thread or "fish" the cabling 54 through the upper tube 66. A plastic, releasably retained side cap 78 includes side edges 80 which insert into grooves 82 on the open side edge 76 of the upper tube 66, thereby closing off the open side edge 76 of the upper tube 66 after the upper tube 66 has been positioned to surround the cabling 54. The upper tube 66 also includes an open bottom end 74, previously mentioned, and an open top end 84 which extends through a construction hole or aperture 86 cut into the ceiling panel 10. The upper tube 66 is thereby utilized to interconnect the aperture 86 in the ceiling panel 10 and the open top end 56 of the lower body assembly 16 which is spaced some distance below the ceiling panel 10.

Figure 3:
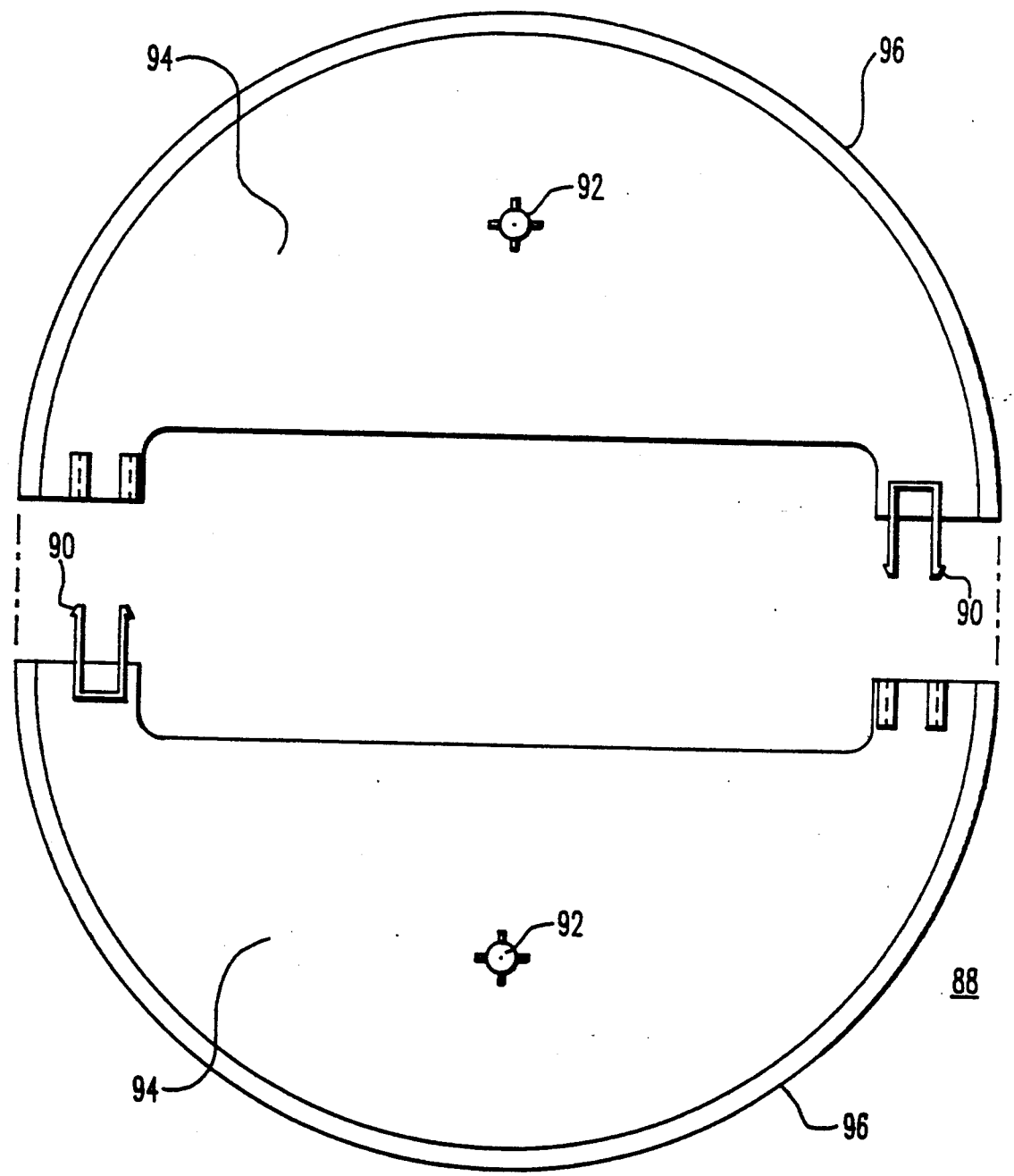
FIG. 3 is a top plan view of the ceiling escutcheon of this invention.

A ceiling escutcheon 88 is used to surround the open top end 84 of the upper tube 66 and to conceal the aperture 86 cut into the ceiling panel 10 for upper tube 66 access. FIG. 3 illustrates the ceiling escutcheon 88 which comprises a plastic 2-piece symmetrically molded construction with snap socket connectors 90 on either side to permit the ceiling escutcheon 88 to be snapped together around the upper tube 66 at the point where the upper tube 66 extends through the aperture 86 in the ceiling panel 10. The ceiling escutcheon 88 includes pin-like projections 92 which extend from the underside 94 of each half 96 of the ceiling escutcheon 88. The pin-like projections 92 are used to pierce the ceiling panel 10 in order to mount the ceiling escutcheon 88 to the ceiling panel 10, thereby concealing the aperture 86 cut into the ceiling panel 10. Fastening means in the form of spring clips 98 are used to secure the pin-like projections 92 to the ceiling panel 10. Washers 100 may or may not be interposed between the spring clips 98 and the ceiling panel 10.

Therefore, the invention provides a ceiling infeed module that may be installed either before or after electrical and communication cables have been installed in order to prevent threading or "fishing" of the cables through the infeed module, as had been previously done with straight-line ceiling infeeds and flexible hose infeeds. Access of the cables for repair or maintenance may thereby be performed with a minimum of effort and disruption.

We claim:

1. A ceiling infeed module for use in routing electrical and communication cable from a suspended ceiling system to a free standing, space dividing wall panel system comprising, in combination, a ceiling panel adapted to be disposed in a suspended ceiling system, said ceiling panel having an aperture therethrough;

a hollow, space dividing wall panel spaced below said ceiling panel having an open top end;

a C-shaped in cross section, tubular member having a top end, a bottom end and an open side edge arranged to receive preexisting electrical and communication cables, said tubular member interconnecting the aperture in said ceiling panel and the top end of said wall panel;

a releasably retained side cap adapted to close off said open side edge of said C-shaped tubular member; and an interconnected means connecting the bottom end of said tubular member and the open top end of said wall panel, said interconnecting means comprising a C-shaped, snap fit, living hinge construction having open ends which are engageable to close said interconnecting means.

2. A ceiling infeed module according to claim 1 wherein said interconnecting means includes interiorly disposed upwardly and downwardly projecting flanges which extend into the bottom end of said tubular member and the top end of said wall panel, respectively.

3. A ceiling infeed module according to claim 1 wherein a ceiling escutcheon surrounds the top end of said tubular member and is mounted to said ceiling panel.

4. A ceiling infeed module according to claim 3 wherein said ceiling escutcheon comprises a 2-piece substantially molded construction which is adapted to be snapped together to surround said tubular member thereby concealing said aperture in said ceiling panel.

5. A ceiling infeed module according to claim 4 wherein said 2-piece ceiling escutcheon includes two halves, each half having two sides, and pin-like projections extending from one side of each half thereof, said pin-like projections constructed and arranged to pierce said ceiling panel and, means securing said pins in said ceiling panel.

6. A ceiling infeed module according to claim 1 wherein said wall panel includes a bottom end comprising a hollow, rectangular base weldment having triangular slots on each side thereof.

7. A ceiling infeed module according to claim 6 wherein a base shroud surrounds said base weldment.

8. A ceiling infeed module according to claim 7 wherein said base includes a 2-piece plastic removable assembly which interlocks with itself and with said base weldment.

9. A ceiling infeed module according to claim 8 wherein said 2-piece base shroud includes an inner side and L-shaped projections, said projections extending from an inner side of each piece of said base shroud to interlock with said triangular slots of said base weldment.

10. A ceiling infeed module according to claim 9 wherein said 2-piece base shroud snaps together to surround said base weldment to thereby enclose and conceal said base weldment.

11. A ceiling infeed module for use in routing electrical and communication cable from a suspended ceiling system to a free standing, space dividing wall panel system comprising, in combination,
a ceiling panel adapted to be disposed in a suspended ceiling system, said ceiling panel having an aperture therethrough;
a hollow, space dividing wall panel spaced below said ceiling panel having an open top end and a bottom end;
an open sided tubular member having a top end and a bottom end interconnecting the aperture in said ceiling panel and the top end of said wall panel;
a releasably retained side cap adapted to close off the open side of said tubular member; and
a transition means interconnecting said wall panel and said tubular member, said transition means comprising a C-shaped, snap fit, living hinge construction having open ends which are engageable to close said transition means.

12. A ceiling infeed module according to claim 11 wherein said transition means connects the bottom end of said tubular member and said open top end of said wall panel, said transition means including interiorly disposed upwardly and downwardly projecting flanges which extend into the bottom end of said tubular member and the top end of said wall panel, respectively.

13. A ceiling infeed module according to claim 11 wherein a ceiling escutcheon surrounds the top end of said tubular member said ceiling escutcheon comprising a 2-piece substantially molded construction which is snapped together around said tubular member and is mounted to said ceiling panel, concealing said aperture in said ceiling panel.

14. A ceiling infeed module according to claim 13 wherein said 2-piece ceiling escutcheon includes pin-like projections extending from one side of each half of said ceiling escutcheon, said pin-like projections constructed and arranged to pierce said ceiling panel and, spring clips securing said pins in said ceiling panel.

15. A ceiling infeed module according to claim 11 wherein said hollow, space division wall panel includes a hollow base weldment adjacent the bottom end thereof and a base shroud adapted to enclose and conceal said base weldment.

16. A space dividing wall panel according to claim 15 wherein said base weldment includes triangular slots on each side thereof.

17. A space dividing wall panel according to claim 16 wherein said base shroud includes a 2-piece plastic removable assembly which interlocks with itself and with said base weldment.

18. A space dividing wall panel according to claim 17 wherein said 2-piece base shroud includes an inner side and L-shaped projections, said projections extending from an inner side of each piece of said base shroud to interlock with said triangular slots of said base weldment.

19. A space dividing wall panel according to claim 17 wherein said 2-piece base shroud snaps together to surround said base weldment to thereby enclose and conceal said base weldment.

20. A ceiling infeed module for use in routing electrical and communication cable from a suspended ceiling system to a free standing, space dividing wall panel system comprising, in combination,
a ceiling panel adapted to be disposed in a suspended ceiling system, said ceiling panel having an aperture therethrough;
a hollow, space dividing wall panel having an open top end spaced below said ceiling panel;
a C-shaped in cross section, tubular member having a top end, a bottom end and an open side edge arranged to receive preexisting electrical and communication cables, said tubular member interconnecting the aperture said ceiling panel and the top end of said wall panel;
a releasably retained side cap adapted to close off said open side edge of said C-shaped tubular member; and
a 2-piece substantially symmetrically molded ceiling escutcheon adapted to be snapped together to surround the top end of said tubular member, said escutcheon including pin-like projections extending from one side of each half thereof constructed and arranged to pierce said ceiling panel, and spring clips securing said pins in said ceiling panel to thereby conceal said aperture in said ceiling panel.

21. A free standing, space dividing wall panel for use in routing electrical and communication cable to a bottom electrical raceway comprising,
a hollow, space dividing wall panel assembly having a bottom end;

a hollow base weldment adjacent the bottom end of said panel assembly, said base weldment including triangular slots therein; and a 2-piece plastic, removable base shroud adapted to interlock with itself and with said base weldment to thereby enclose and conceal said base weldment, said 2-piece base shroud including L-shaped projections thereon, said L-shaped projections extending from an inner side of each piece of said base shroud and interlocking with said triangular slots of said base weldment.

* * * * *